US 8,156,122 B2

(12) United States Patent
Iwatsu et al.

(10) Patent No.: US 8,156,122 B2
(45) Date of Patent: Apr. 10, 2012

(54) INFORMATION REPRODUCTION DEVICE AND METHOD AND PROGRAM

(75) Inventors: Takeshi Iwatsu, Kanagawa (JP); Takashi Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 133 days.

(21) Appl. No.: 10/573,418

(22) PCT Filed: Aug. 6, 2004

(86) PCT No.: PCT/JP2004/011629
§ 371 (c)(1),
(2), (4) Date: Mar. 27, 2006

(87) PCT Pub. No.: WO2005/033952
PCT Pub. Date: Apr. 14, 2005

(65) Prior Publication Data
US 2007/0055643 A1   Mar. 8, 2007

(30) Foreign Application Priority Data
Sep. 30, 2003   (JP) .................... 2003-341662

(51) Int. Cl.
*G06F 7/00* (2006.01)

(52) U.S. Cl. .......... 707/738; 707/813; 711/118; 725/86; 725/105; 725/143

(58) Field of Classification Search .................. 709/217, 709/219, 213, 203, 220; 711/133, 118; 707/999.001, 738, 795, 796, 813; 725/86, 725/105, 143
See application file for complete search history.

(56) References Cited

U.S. PATENT DOCUMENTS
5,913,033 A   6/1999   Grout
6,128,668 A * 10/2000   Barber et al. ................. 709/246
6,275,496 B1 *  8/2001   Burns et al. .................... 370/429
(Continued)

FOREIGN PATENT DOCUMENTS
JP   10-283246   10/1998
(Continued)

OTHER PUBLICATIONS

Ortega, A. and Carignano, F. and Ayer, S. and Vetterli, M, "Soft caching: Web cache management techniques for images" https://eprints.kfupm.edu.sa/65510/65510.pdf, IEEE Signal Processing Society 1997.*

(Continued)

*Primary Examiner* — Dennis Truong
(74) *Attorney, Agent, or Firm* — Oblon, Spivak, McClelland, Maier & Neustadt, L.L.P.

(57) ABSTRACT

An information processing apparatus that connects with an external apparatus via a network includes a transmitter that transmits a request for page information to the external apparatus. A receiver receives the page information, which includes identification information corresponding to content data and the content data. A memory stores the content data, based on the identification information independently of the page information. An interface outputs the content data along with the page information. A controller detects whether the memory is storing the content data independently of the page information, controls the interface to output the content data stored by the memory without an inquiry via the network when the controller detects that the memory is storing the content data independently of the page information, and controls the receiver to receive the content data from the external apparatus via the network when the content data is not stored in the memory.

15 Claims, 5 Drawing Sheets

U.S. PATENT DOCUMENTS

| | | | |
|---|---|---|---|
| 6,415,368 B1* | 7/2002 | Glance et al. | 711/158 |
| 6,470,378 B1* | 10/2002 | Tracton et al. | 709/203 |
| 6,681,298 B1* | 1/2004 | Tso et al. | 711/133 |
| 6,721,850 B2* | 4/2004 | Hofmann et al. | 711/133 |
| 6,757,708 B1* | 6/2004 | Craig et al. | 709/203 |
| 6,785,784 B1* | 8/2004 | Jing et al. | 711/154 |
| 6,826,597 B1* | 11/2004 | Lonnroth et al. | 709/207 |
| 6,944,676 B1* | 9/2005 | Armbruster et al. | 709/243 |
| 6,976,090 B2* | 12/2005 | Ben-Shaul et al. | 709/246 |
| 6,986,018 B2* | 1/2006 | O'Rourke et al. | 711/213 |
| 7,020,658 B1* | 3/2006 | Hill | 1/1 |
| 7,190,284 B1* | 3/2007 | Dye et al. | 341/51 |
| 2001/0047516 A1* | 11/2001 | Swain et al. | 725/86 |
| 2002/0002625 A1* | 1/2002 | Vange et al. | 709/246 |
| 2002/0059592 A1* | 5/2002 | Kiraly | 725/37 |
| 2002/0087797 A1* | 7/2002 | Adrangi | 711/133 |
| 2003/0028673 A1 | 2/2003 | Lin et al. | |
| 2004/0117578 A1* | 6/2004 | Castelli et al. | 711/170 |
| 2004/0244042 A1* | 12/2004 | Billmaier | 725/110 |
| 2005/0060701 A1 | 3/2005 | Murase | |
| 2005/0091679 A1 | 4/2005 | Tanaka et al. | |

FOREIGN PATENT DOCUMENTS

| | | |
|---|---|---|
| JP | 2000-513123 | 10/2000 |
| JP | 2001-222491 | 8/2001 |
| JP | 2003-22210 | 1/2003 |
| JP | 2003-122620 | 4/2003 |
| JP | 2003-153229 | 5/2003 |
| JP | 2003-242018 | 8/2003 |
| WO | 99/53422 | 10/1999 |
| WO | WO 2004/008334 A1 | 1/2004 |

OTHER PUBLICATIONS

U.S. Appl. No. 10/526,902, filed Aug. 16, 2005, Yamashita et al.
U.S. Appl. No. 10/554,542, filed Oct. 25, 2002, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, fileld Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.
Ari Luotonen, "World-Wide Web proxies", Computer Networks and ISDN Systems, North Holland Publishing. Amsterdam, NL, XP004037985, vol. 27, No. 2, Nov. 1994, pp. 147-154.

* cited by examiner

_US 8,156,122 B2_

INFORMATION REPRODUCTION DEVICE AND METHOD AND PROGRAM

TECHNICAL FIELD

The present invention relates to information reproduction apparatus, method, storage medium and program, and more particularly relates to information reproduction apparatus, method, storage medium and program that reduce unnecessary access from a client terminal to a server via a network by caching page information including compressed content data.

BACKGROUND ART

A small-size electronic device that stores and processes input information can temporarily store input information in an internal storage medium, and then process data in a prescribed manner. These kinds of electronic devices are for example preferably applied to a music data delivery system and the like. They include such terminal devices as personal computers, home game machines, and mobile phones. In information delivery systems for these kinds of electronic devices, a technique of web cache is utilized to make it easier to deliver desired information. In the process of web cache, data of searched web pages are stored in a certain memory on a client terminal side for future use, which is to say the data stored are utilized to display the web pages next time they are requested.

In general, World Wide Web (WWW) browsers such as Internet Explore are equipped with a function that can display and browse pages in response to user operation. The WWW browser can perform the process of web cache to display web pages. To improve its response time, the WWW browser caches pages before a user moves to this layer. The WWW browser also caches the pages browsed. This eliminates unnecessary network access when the user returns to the previous layers. For example, the WWW browser can cache page information of a certain URL with its last access date and time. The WWW browser can cache pages on different layers.

There has been proposed information processing apparatus that searches through the Internet for web pages provided by WWW services of video cameras and displays them on a display section for example (Patent Document 1). This allows even a small-size electric device to implement the web cache, by storing data of searched web pages in an external storage medium. When the same web pages are requested, the device can quickly display them, because this device does not search for them again through the Internet. The device reads out their data from the storage medium, and then displays the web pages based on them.

That is to say, those kinds of electronic devices do not download the page information (content) through the Internet when a user specifies the same URL. The devices read out them from cache memories of the client terminal (video cameras). In this case, both to improve the efficiency of usage of the cache memories and to store new data in them at any time, the device removes data with the oldest last-access time from them due to the limitation of its capacity.

Patent Document 1: Japanese Patent Publication No. 2003-122620 (Paragraph Number [0010] through [0018], and FIG. 1)

However, according to the conventional method of web cache, the WWW browser, such as Internet Explore, caches web pages in a page unit. The terminal device with a small-capacity memory, such as mobile phones, cannot repeatedly read out the content (image data, sound information and the like) even if this content is included in a plurality of pages. This would be an inefficient use of the memory.

Also, the web pages that users often visit include a large amount of content data such as sound data and image data, and many are rarely updated on the Web for example. Particularly, it takes time to download data of portal web pages through a network, when these content data are not cached in the terminal device.

In addition, the format of cache data is defined on the Web. The terminal device needs time to convert the format each time it uses the data. Therefore, even if the terminal device utilizes the data stored in the cache, it needs time to process them.

DISCLOSURE OF THE INVENTION

The present invention has been made in view of the above points and is intended to provide information reproduction apparatus, method, storage medium and program that can efficiently utilize a comparatively large amount of content data included in web pages by controlling them as objects independent of page information.

To solve the above problem, an information reproduction apparatus according to the present invention including: transmission reception means for transmitting request information requesting page information from an external apparatus, and receiving the page information and prescribed content data included in the page information, the external apparatus being connected via a network; content data acquisition means for acquiring content data corresponding to a content data acquisition request included in the page information received by the transmission reception means; storage means for storing the content data acquired by the content data acquisition means; output means for outputting the content data acquired by the content data acquisition means along with the page information; and control-means for detecting whether or not the content data corresponding to the content data acquisition request is registered in the storage means, and controlling the content data acquisition means such that when the content data is registered the content data is acquired from the storage means by the content data acquisition means, and when the content data is not registered in the storage means the content data is acquired from the external apparatus via the transmission reception means.

In addition, an information reproduction method according to the present invention including: a transmission step of transmitting request information requesting page information from an external apparatus, the external apparatus being connected via a network; a reception step of receiving from the external apparatus the page information requested by a process of the transmission step, the page information including a content data acquisition request; a detection step of detecting whether or not content data corresponding to the content data acquisition request is registered in certain storage apparatus, the content data acquisition request being received by a process of the reception step; an acquisition step of acquiring the content data such that when a process of the detection step detects that the content data corresponding to the content data acquisition request included in the page information is registered in the storage apparatus the content data is acquired from the storage apparatus, and when the process of the detection step detects that the content data is not registered the content data corresponding to the content data acquisition request is acquired from the external apparatus; a storage step of, when the process of the detection step detects that the content data is not registered, storing in the storage apparatus the content data acquired by a process of the acquisition step;

and an output step of outputting the content data acquired by the process of the acquisition step along with the page information.

In addition, a program for causing a computer to execute: a transmission step of transmitting request information requesting page information from an external apparatus, the external apparatus being connected via a network; a reception step of receiving from the external apparatus the page information requested by a process of the transmission step, the page information including a content data acquisition request; a detection step of detecting whether or not content data corresponding to the content data acquisition request is registered in certain storage apparatus, the content data acquisition request being received by a process of the reception step; an acquisition step of acquiring the content data such that when a process of the detection step detects that the content data corresponding to the content data acquisition request included in the page information is registered in the storage apparatus the content data is acquired from the storage apparatus, and when the process of the detection step detects that the content data is not registered the content data corresponding to the content data acquisition request is acquired from the external apparatus; a storage step of, when the process of the detection step detects that the content data is not registered, storing in the storage apparatus the content data acquired by a process of the acquisition step; and an output step of outputting the content data acquired by the process of the acquisition step along with the page information.

With the information reproduction apparatus, method and program according to the present invention, it is possible to reproduce content data (sound and image data) of web pages without downloading them every time when accessing a network. This makes it possible to quickly reproduce web pages.

BEST-MODE FOR CARRYING OUT THE INVENTION

An embodiment of the present invention will be described in detail. The information reproduction apparatus according to an embodiment of the present invention can utilize a comparatively large amount of content data included in pages by controlling them as objects independent of page information.

Figure 1:
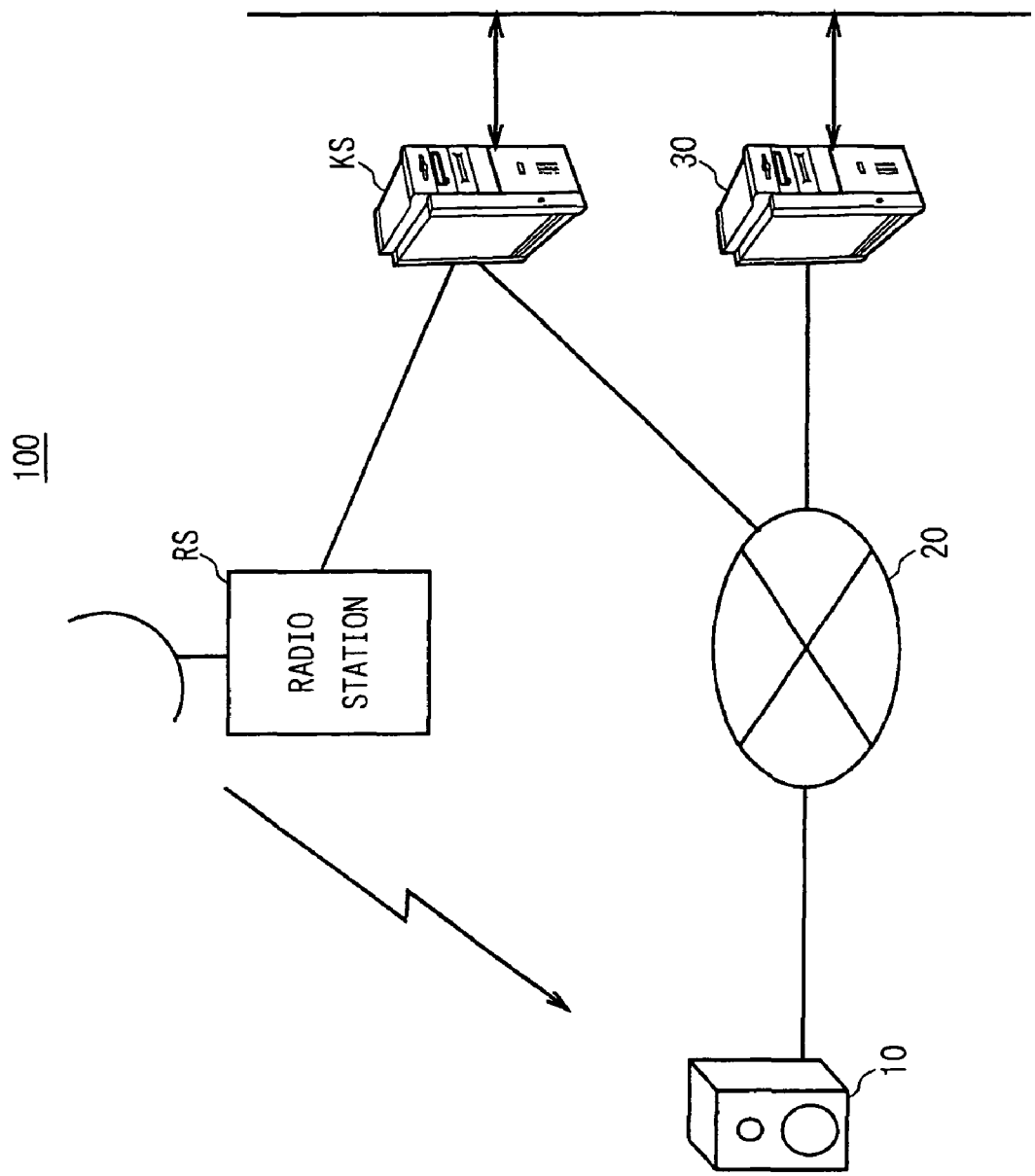
FIG. 1 is a diagram showing the overall configuration of an information provision system to which an information reproduction device according to an embodiment of the present invention is applied as a client terminal.

FIG. 1 shows the overall configuration of an information provision system to which an information reproduction device of the present embodiment can be applied as a client terminal.

As shown in FIG. 1, the reference numeral 100 denotes the whole of an information provision system. A client terminal 10 receives broadcasting from a radio station RS.

In this information provision system 100, an associated information provision server KS (with computer configuration) is connected to the radio station RS via an exclusive line. Instead of the radio station RS, the associated information provision server KS publishes web pages of the radio station RS. In response to acquisition requests from the client terminal 10, the associated information provision server KS supplies information associated with music broadcast from the radio station RS to the client terminal 10 via a network such as the Internet 20. The information associated with music is also referred to as "associated information".

The associated information provision server KS in the information provision system 100 supplies to a URL provision server 30 (with computer configuration) URL information representing addresses which are to be accessed to use information provision service provided through web pages on the Internet 20.

When the URL, representing addresses which are to be accessed to use the information provision service, is updated, the associated information provision server KS supplies the updated URL to the URL provision server 30, and then the URL provision server 30 manages it. Therefore, when the client terminal 10 requests the latest URL representing addresses which are to be accessed to use the information provision service of the radio station RS, the URL provision server 30 supplies it to the client terminal 10.

Radio receivers can receive broadcasting only from certain stations in a certain area. Therefore, a plurality of areas may utilize the same frequencies. For example, the frequency of 80.0 MHz is used by FM Tokyo in the Tokyo area, while it is used by FM Aomori in the Tohoku district.

Accordingly, it is difficult for the URL provision server 30 to determine the radio station RS if the client terminal 10 only specifies a corresponding frequency. In this case, the client terminal 10 supplies to the URL provision server 30 a call sign that is unique to the radio station RS. Based on the call sign, the URL provision server 30 supplies to the client terminal 10 the URL representing addresses which are to be accessed to use the information provision service of the radio station RS.

One example of the processes of reproduction of information on the above-noted client terminal 10 will be described below.

Figure 2:
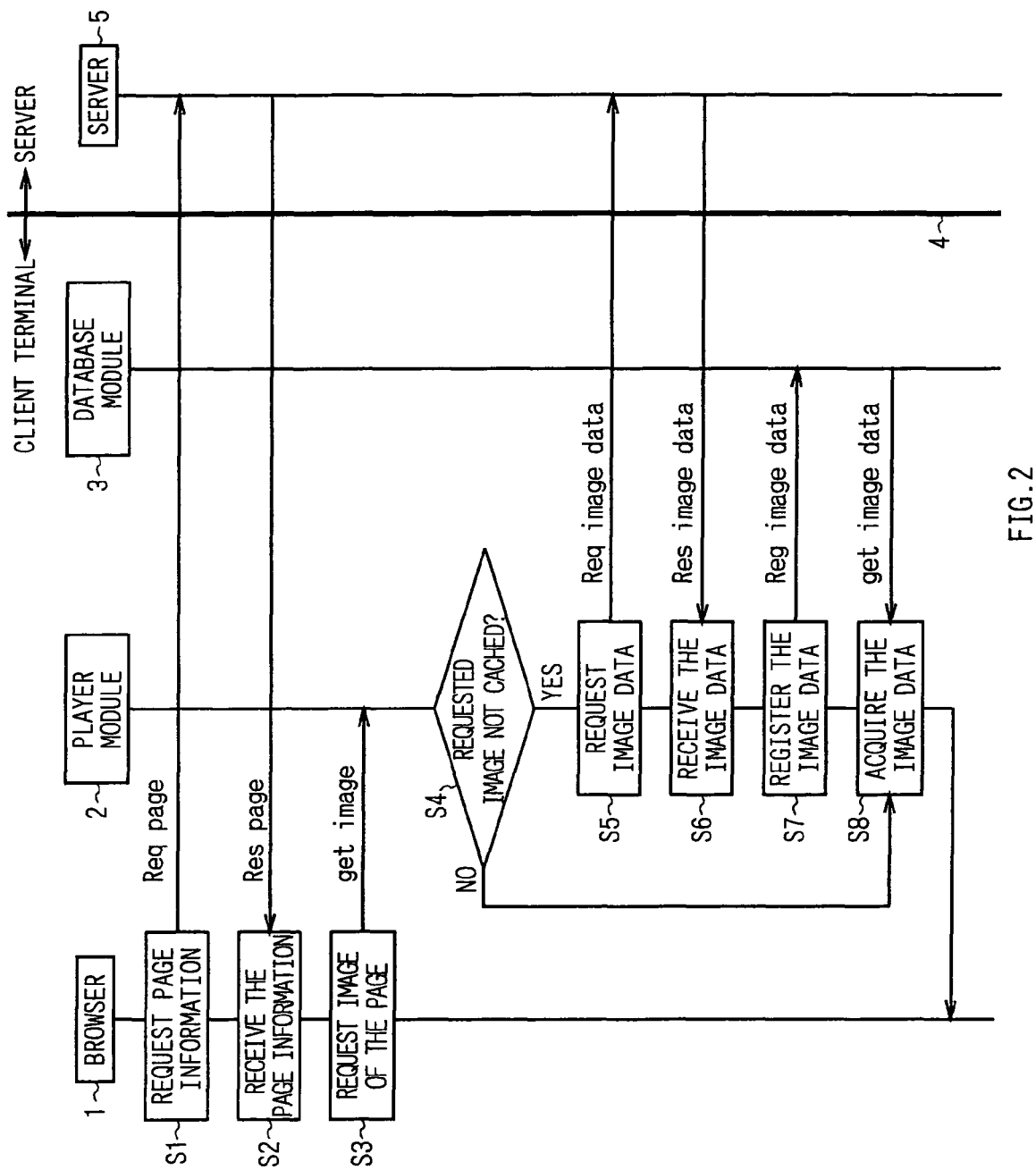
FIG. 2 is a flowchart illustrating a process of reproduction of image data on the information reproduction device according to an embodiment of the present invention.

FIG. 2 shows a flowchart illustrating a sequence of reproduction of image data on the information reproduction device according to an embodiment of the present invention.

The client terminal 10 shown in FIG. 1 includes a browser 1, a player module 2, and a database module 3. The client terminal 10 is connected to an external device or server 5 via a network 4 (equivalent to the Internet 20) such as WWW web. The browser 1 is a program or software. The browser 1 transmits request information to request page information from the server 5, and receives the page information including certain content data and then displays them. Transmission reception means of the client terminal 10 includes this browser 1, a communication module 31 (FIG. 4) described below, and the like.

When displaying another screen, the browser 1 transmits to the server 5 request information (Req Page) that requests this screen (Step S1). In response to the request information, the response server 5 transmits page information-or web page (Res Page) that includes a reproduction command of a certain image data, and the browser 1 receives it (Step S2). To display the web page received, the browser 1 subsequently determines the image data (content data) of this page based on the reproduction command included in the page information, and requests this image data from the player module 2 (get image (Step S3)).

The database module 3 has already stored a plurality of content data such as image data that can be reproduced by the player module 2. The player module 2 checks whether or not this database module 3 has stored the image data requested (Step S4). When the result of the check is that the database module 3 has stored that image data, the player module 2 does not inquire of the server 5, and then this image data is just supplied from the database module 3 to the player module 2. When the result of the check is that the database module 3 has not stored that image data, the player module 2 requests this image data from the server 5 (Req image data (Step S5)), and receives it from the server 5 as a response (Res image data) and as data stored in the database module 3 (Step S6).

And then the player module 2 registers the image data received in the database module 3 (Reg image data (Step S7)). After that, the player module 2 supplies to the browser 1 the image data acquired from the server 5 (Step S8). The browser 1 displays the image data acquired on a monitor (not shown) or the like.

If the database module 3 has stored (cached) this reproduction-target image data, the player module 2 acquires this image data from the database module 3 (get image data), and then supplies it to the browser 1 (Step S8). The browser 1 displays the image data acquired on a monitor (not shown) or the like.

When registering the image data acquired in the database module 3, the player module 2 converts the format of the image data to meet the specifications of the browser 1. This improves the performance of the browser 1 of the client terminal 10 for displaying the images. Accordingly, it is desirable that the client terminal 10 converts image data into a specific compression format and forces it to be a specific data size for ease of use before registering it in the database module 3.

For example, when image data compressed in Graphics Interchange Format (GIF) is supplied from external devices, the client terminal 10 converts them into BMP format. When sound data compressed in MPEG Audio Layer 3 (MP3) format is supplied, the client terminal 10 for example converts them into Pulse Code Modulation (PCM) format. It may be desirable that, depending on the free space available on the database module 3, the database module 3 saves image data in compression format. The database module 3 may store image data that the client terminal 10 often uses in decoded format (i.e., decompressed or expansion).

According to the process described above, the client terminal 10, whose browser 1 is connected to the server 5 on the Internet to use Web services, can quickly reproduce and display web pages by dealing with image data as objects independent of the page information.

The browser 1 used its cache memory to cache page information in page unit. In this embodiment, the browser 1 caches the sound and image data independent of the pages. This improves its usability.

Figure 3:
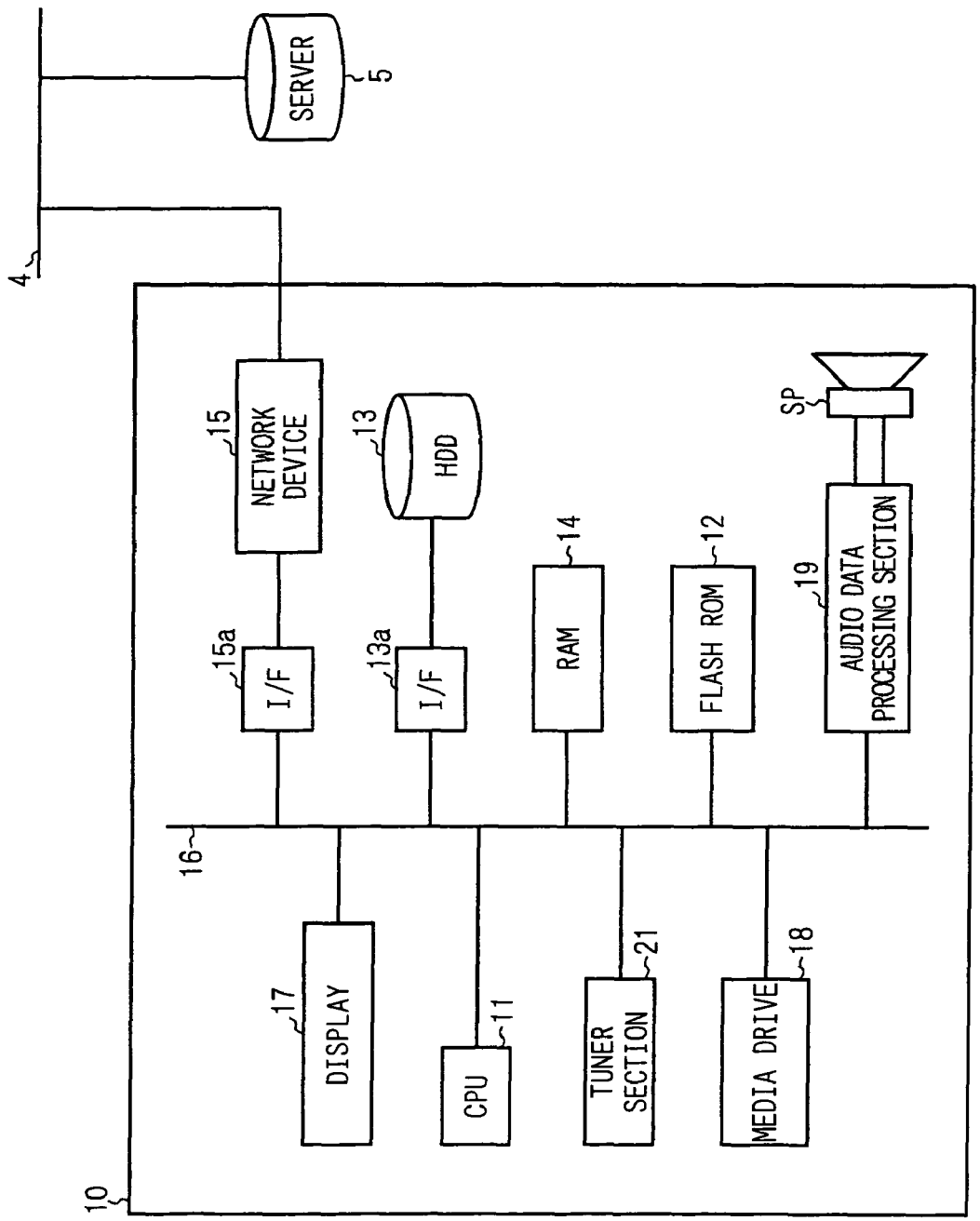
FIG. 3 is a block diagram showing the circuit configuration of the information reproduction device according to an embodiment of the present invention.

FIG. 3 is a block diagram showing the circuit configuration of the information reproduction device according to an embodiment of the present invention.

The client terminal 10 includes a Central Processing Unit (CPU) 11, a flash Read Only Memory (ROM) 12 for storing programs, a Hard Disk Drive (HDD) 13, a Random Access Memory (RAM) 14 where programs are loaded when executing them, a network device 15 for connecting to networks, and a bus 16.

The CPU 11 is control means that takes overall control of the terminal 10 and performs prescribed arithmetic processes based on the basic programs (such as OS programs) and various application programs loaded from the flash ROM 12 to the RAM 14 via the bus 16. For example, the CPU11 also performs the following: communication process through the network 4; process for controlling user's input/output operation; process for playing back content data in media; process for recording content data downloaded from the radio station RS; and process for managing the HDD 13. The HDD 13 is connected to the bus 16 via an interface (I/F) 13a.

The network device 15 is connected to the bus 16 via an interface (I/F) 15a. The network device 15 under the control of the CPU 11 encodes data that it will transmit, and then transmits them to external network-support devices via the network 4. When receiving data from external network-support devices, the network device 15 transmits the received data to the CPU 11 after decoding them.

A display 17 is for example equivalent to a liquid crystal display. The display 17 may be directly connected to the surface of the main body of the client terminal 10, or externally connected to it. The display 17 displays various kinds of information such as the result of process of the CPU 11.

A media drive 18 is for example equivalent to a Compact Disc (CD) player and a memory player for playing back data in "MEMORY STICK (Registered Trademark of Sony Corporation)" including flash memories. The media drive 18 subsequently supplies the resulting data to an audio data processing section 19. The audio data processing section 19 performs digital-to-analog conversion for the supplied data, and then outputs them from a 2-channel speaker SP.

When the media drive 18 obtains music data (audio content), the CPU 11 stores them in the HDD 13 as audio data files.

The HDD 13 may have stored some sound data and image data when the client terminal 10 was manufactured. In this case, the client terminal 10 does not have to download those data via the network 4 from external devices such as the server 5 that is equivalent to the associated information provision server KS. The same could be said for the content data already cached. When a web page is updated such that it includes new sound and image data, the client terminal 10 adds these data to the HDD 13.

For example, the CPU 11 controls the media drive 18 to read out a plurality of static images from the "MEMORY STICK (Registered Trademark of Sony Corporation)". The CPU 11 can display them on the display 17 as if slide-show. The CPU 11 randomly reads out a plurality of music data from the HDD 13, and reproduces them in user's desired order as if jukebox.

The client terminal 10 also includes a tuner section 21 connected to the bus 16. The tuner section 21 is for example equivalent to an AM/FM tuner. The tuner section 21 under the control of the CPU 11 demodulates broadcast signals received, and supplies them via the audio data processing section 19 to the speaker SP. The speaker SP therefore outputs sound of broadcasting.

Figure 4:
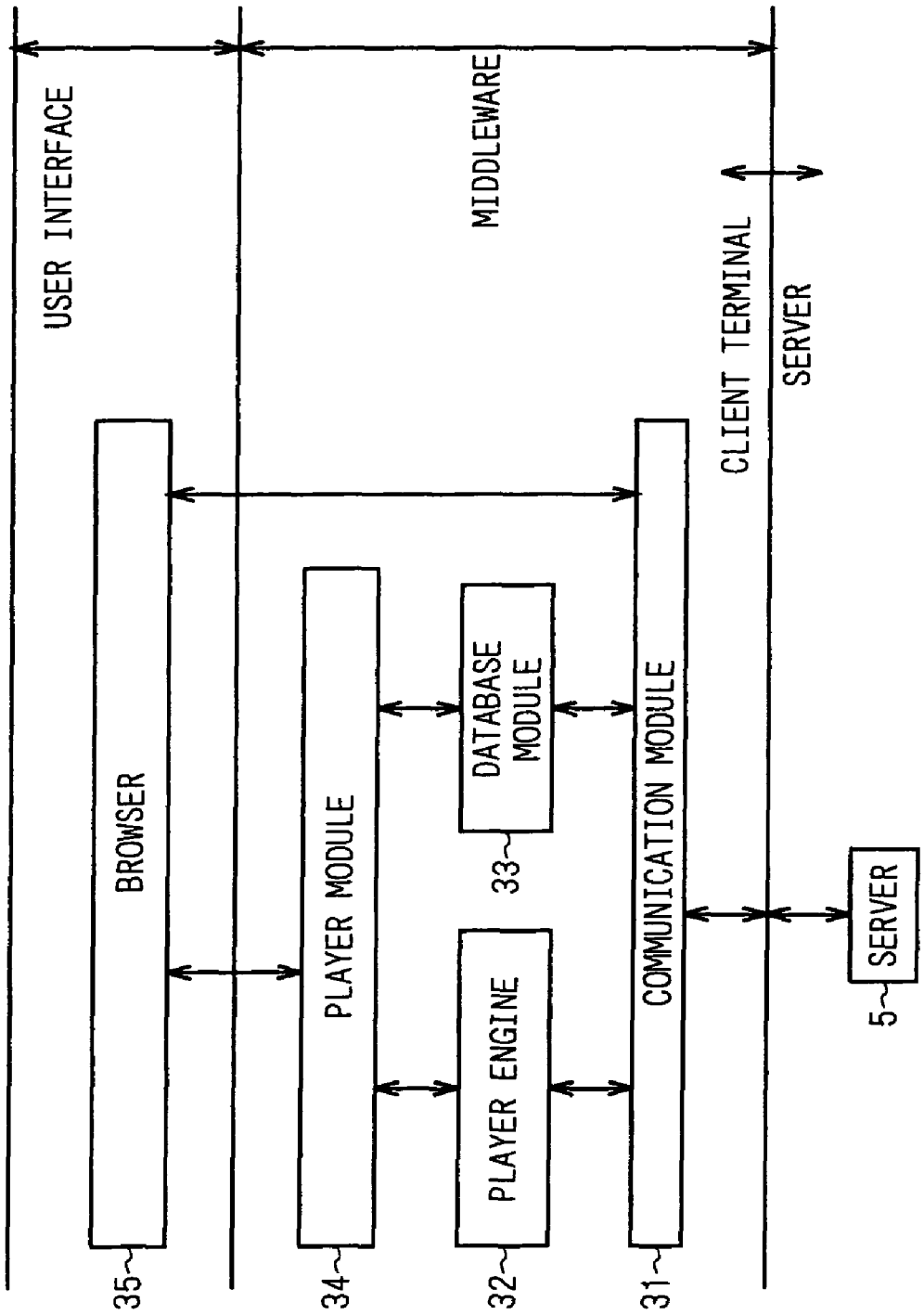
FIG. 4 is a diagram showing program modules of the information reproduction device according to an embodiment of the present invention.

FIG. 4 is a diagram showing program modules of the information reproduction device according to an embodiment of the present invention.

Program modules of the client terminal 10 include middleware and a user interface. This middleware includes; a communication module 31 for controlling network communication; a player engine 32 for converting content data based on its format and data size; a database module 33 for storing content data; and a player module 34 for controlling reproduction process of displaying image and outputting sound effects. The user interface is equivalent to a browser 35 that displays web pages images and outputs their sound effects. For example, the above-noted browser 1 is equivalent to the browser 35, the above-noted player module 2 is equivalent to the player module 34, and the above-noted database module 3 is equivalent to the database module 33.

The player module 34, which displays images and outputs sound effects, interprets display commands included in the page information received by the communication module 31 to display images such as Joint Photographic Expert Group (JPEG) data. The player module 34 controls reproduction process. For example, when storing content data received from a plurality of servers 5, the player module 34 issues identification information (ID data) unique to each content data, and associates them with the corresponding content data.

The page information received includes a URL as well as the display command of image data. This URL indicates an address of network where the ID data and corresponding image data exist. Based on the ID data, the browser 35 only reproduces a specific content data. And the browser 35 caches content data with a prescribed attribute. If the database module 33 has not stored the corresponding content data, the browser 35 accesses the URL to acquire this content data from a prescribed server 5.

For example, when a file name shown in the ID data (Universal Resource Identifier (URI)) is "vendor+id", the player module 34 interprets this file name and acquires cache data from the database module 33.

The browser 35 recognizes the number of times content data have been reproduced by counting the number of reproduction commands included in the page information received by the communication module 31. Based on that, the browser 35 removes less-commonly reproduced content data from the database module 33. In this manner, the client terminal 10 may perform removal process depending on the free space on the memory. In this removal process, less-commonly used data can be automatically removed when registering new sound or image data. This improves the efficiency of managing resources.

In response to user's operation, the browser 35 registers content data in the database module 33, along with information (indicator) showing how important this content data is. Therefore, based on the information of importance, the browser 35 may determine that it will not remove the content data even if it has been less commonly reproduced.

Accordingly, by using the information of importance, the client terminal 10 prevents important sound and image data from being removed. In this case, when the number of data cached in the database module 33 exceeds a certain threshold, the client terminal 10 may remove all files except for specific vender's files based on the file name of the URI.

If the browser 35 receives compressed content data from the server 5, the browser 35 may decompress the data before registering them in the database module 33 in response to the vendor ID included in the data. Accordingly, the browser 35 does not have to decompress the data before reproducing them. This can be applied to content (such as portal web pages) that users often use. This enables the client terminal 10 to quickly reproduce content data.

In addition, when receiving content data from the server 5, the browser 35 converts them into a specific compression format, and forces them to be a specific data size to meet the characteristic of the player engine 32, before registering them in the database module 33. In this manner, before being registered, sound data and image data are converted into a specific data format in accordance with the characteristic of the client terminal 10. This reduces the processing loads associated with them.

The process of reproduction of compressed sound data (MP3 data, for example) on the above-noted information reproduction device will be described below.

Figure 5:
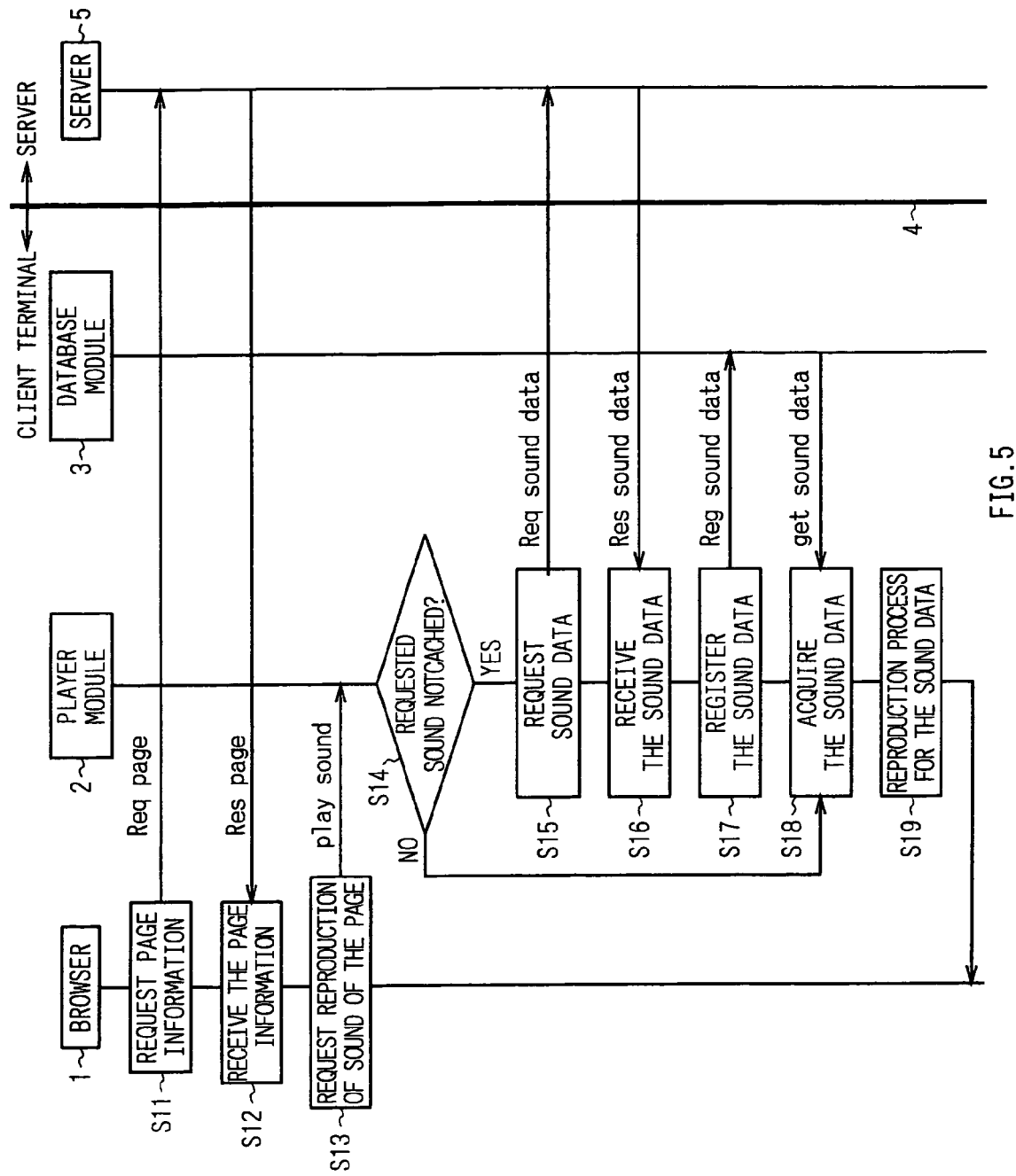
FIG. 5 is a flowchart illustrating a process of reproduction of sound data on the information reproduction device according to an embodiment of the present invention.

FIG. 5 is a flowchart showing the process of reproduction of sound data on the information reproduction device according to an embodiment of the present information. In this case, content data, specified by a reproduction command, can be image data or sound data.

The browser 1, player module 2 and database module 3 are the same as the corresponding parts shown in FIG. 2 (FIG. 2 shows the process of reproduction of image data). The browser 1, player module 2 and database module 3 are connected to the server 5 via the network 4 such as WWW Web.

When displaying another screen, the browser 1 transmits to the server 5 request information (Req Page) that requests this screen (Step S11). In response to the request information, the server 5 transmits page information or web page (Res Page) that includes a reproduction command of a certain sound data, and the browser 1 receives it (Step S12). When displaying the web page received, the browser 1 subsequently determines the sound data (corresponding to a request for music) of this page based on the reproduction command included in the page information, and requests this sound data from the player module 2 (play sound (Step S13)).

The database module 3 has already stored a plurality of content data such as image and sound data that can be reproduced by the player module 2. The player module 2 checks whether or not this database module 3 has stored the sound data requested (Step S14). When the result of the check is that the database module 3 has stored that sound- data, the player module 2 does not inquire of the server 5, and then this sound data is just supplied from the database module 3 to the player module 2. When the result of the check is that the database module 3 has not stored that sound data, the player module 2 requests this sound data from the server 5 (Req sound data (Step S15)), and receives it from the server 5 as a response (Res sound data) and as music data stored in the database module 3 (Step S16).

And then the player module 2 registers the sound data received in the database module 3 (Reg sound data (Step S17)). After that, the player module 2 reproduces the sound data acquired from the server 5 (Step S19).

If the database module 3 has stored (cached) this reproduction-target sound data, the player module 2 acquires this sound data from the database module 3 (get sound data (Step S18)). The player module 2 reproduces the sound data acquired (Step SP19).

When registering the sound data acquired in the database module 3, the player module 2 converts the format of the sound data to meet the specifications of the browser 1. This improves the performance of the browser 1 of the client terminal 10 for reproducing the sounds when displaying the images.

According to the process described above, the client terminal 10, whose browser 1 is connected to the server 5 on the Internet to use Web services, can quickly reproduce and display web pages by dealing with image and sound data as objects independent of the page information. In addition, since the client terminal 10 has previously stored those data, it does not have to perform download process. This enables the client terminal 10 to quickly display web pages.

As described above, when a music data is registered in the database module 3, the information reproduction device can reproduce the music without inquiring of the server 5. By contrast, when the music data is not registered in the database module 3, the information reproduction device acquires the music data from the server 5. And then the information reproduction device reproduces the music data after registering it in the database module 3.

When registering music data in the database module 3, the player module 2 converts them into a certain format to meet the specifications of the player module 2. This enables the client terminal 10 to quickly start reproducing sound data. In addition, this improves the performance associated with the reproduction process.

The above-noted information reproduction device (the client terminal 10) manages content data (sound and image data) of web pages separate from the pages. In this manner, this device does not cache pages in page unit. Therefore, this device can quickly reproduce web pages with a small memory.

Before the above-noted information reproduction device (the terminal device) is shipped out, content data (sound and image data) that would be often used in various web pages are stored in its memory. Therefore, the device does not have to download them to display those pages.

When accessing a web page including new content data (sound and image data), the above-noted information reproduction device adds them to the database. In this manner, this device has scalability.

And, when registering new content data (sound and image data), the above-noted information reproduction device automatically removes relatively less used data from the nonvolatile memory of the device depending on the free space on it. This improves the efficiency of managing resources.

In addition, the above-noted information reproduction device issues indicators which show how important cached content data are. This prevents important content data (sound and image data) from being removed automatically.

On the Web, content data (sound and image data) are supplied in various kinds of formats and data sizes. However, the above-noted information reproduction device converts them into a specific format and forces them to be a specific data size to meet the specifications of the device, before registering them. Therefore, since the device does not have to perform conversion process again, it can quickly reproduce them.

The above-noted processes can be executed by a computer. In this case, the program, describing the contents of the processes executed by the information reproduction device, could be supplied to the computer. To perform the above-noted processes, the computer follows the description of the program. This program can be stored in a storage medium that computers can read. This storage medium can be a magnetic storage device, optical disc, magnetic optical storage medium, semiconductor memory or the like. The magnetic storage device includes a hard disk device (HDD), flexible disk (FD), and-magnetic tape. The optical disc includes Digital Versatile Disc (DVD), DVD-RAM, CD-ROM, and CD-R (Recordable)/RW (ReWritable). The magnetic optical storage medium includes Magneto-Optical (MO) disk.

To supply the program, this program may be stored in portable storage media,(such as DVD, CD-ROM) for sale. Alternatively, the program can be downloaded via a network to target computers from a server computer whose storage device has previously stored this program.

To execute the program, a computer obtains this program from the portable storage media or the server computer, and then stores this program in its own storage device. Then the computer reads out the program from that storage device to execute this program. The computer may directly read out the program from the portable storage medium and execute this program to perform the process. While receiving the program from the server computer, the computer may execute the program received to perform the process.

In the above-noted embodiments, the client terminal 10 for example wirelessly receives a radio broadcast signal from the radio station RS. However, the present invention is not limited to this. The client terminal 10 may receive a radio broadcast data from Internet radio servers via a network such as the Internet.

In the above-noted embodiments, the client terminal 10 is applied as the information reproduction apparatus. However, the present invention is not limited to this. For example, various kinds of information processing devices (such as personal computers and audio devices), portable terminal devices (such as cell phones and Personal Digital Assistance (PDA)) and the like can be applied as the information reproduction apparatus.

In the above-noted embodiments, the client terminal 10 utilizes the preinstalled programs to perform the above-noted processes (illustrated by FIG. 2, FIG. 5 and the like). However, the present invention is not limited to this. The client terminal 10 can be equipped with hardware or circuit blocks that performs the above-noted processes (illustrated by FIG. 2, FIG. 5 and the like). This enables the client terminal 10 to perform those processes by controlling the circuit blocks equipped.

Industrial Applicability

The present invention can be utilized for a music delivery system, which can manage copyright of music information that is supplied to users when directly supplying information associated with content such as music and image via the Internet to apparatus such as audio devices connected to the network using broadband.

The invention claimed is:

1. An information processing apparatus, comprising:
means for transmitting a call sign of a radio station and for transmitting a request to a Uniform Resource Locator (URL) for page information;
means for receiving the URL in response to a transmission of the call sign of the radio station, for receiving said page information, which includes identification information corresponding to content data, from an external apparatus in response to the request to the URL, and for receiving said content data, the identification information identifying a vendor;
storing means for storing said content data received by said means for receiving, based on said identification information, independently of said page information, and for storing a file of another vendor;
means for outputting said content data along with said page information; and
control means for registering in said storing means, in response to the identification information, said content data in an uncompressed format upon a reception of said content data in a compressed format from said external apparatus, for detecting whether said storing means is storing said content data independently of said page information, for controlling said means for outputting to output said content data from said storing means without an inquiry to the external apparatus when said control means detects that said storing means is storing said content data independently of said page information, for controlling said means for receiving to receive said content data from the external apparatus when said content data is not stored in said storing means, and for removing all files from said storing means except for files of the vendor.

2. An information processing method, comprising:
transmitting a call sign of a radio station;
receiving a Uniform Resource Locator (URL) in the response to the transmitting;
transmitting a request to the URL for page information;
receiving from an external apparatus the page information in response to the request to the URL, the page information including identification information corresponding to content data, the identification information identifying a vendor;
detecting whether the content data is stored in a storage apparatus independently of said page information;
acquiring, when the detecting detects that the content data is stored in said storage apparatus independently of said page information, said content data from said storage apparatus without an inquiry to the external apparatus;
acquiring, when the detecting detects that said content data is not stored in said storage apparatus, the content data from said external apparatus;
registering in said storage apparatus, in response to the identification information, the content data in an uncompressed format upon a reception of the content data in a compressed format from said external apparatus;
storing, in said storage apparatus, the content data acquired in the acquiring from said external apparatus, based on said identification information, independently of said page information;
storing in said storage apparatus a file of another vendor;
outputting the content data from said storage apparatus along with said page information on an output interface; and
removing all files from said storage apparatus except for files of the vendor.

3. A computer-readable medium that stores computer executable instructions, wherein the computer executable instructions, when executed by a processing unit, cause the processing unit to perform a method comprising:
transmitting a call sign of a radio station;
receiving a Uniform Resource Locator (URL) in response to the transmitting;
transmitting a request to the URL for page information;
receiving from an external apparatus the page information in response to the request to the URL, the page information including identification information corresponding to content data, the identification information identifying a vendor;
detecting whether the content data is stored in a storage apparatus independently of said page information;
acquiring, when the detecting detects that the content data is stored in said storage apparatus independently of said page information, said content data from said storage apparatus without an inquiry to the external apparatus;
acquiring, when the detecting detects that said content data is not stored in said storage apparatus, the content data from said external apparatus;
registering in said storage apparatus, in response to the identification information, the content data in an uncompressed format upon a reception of said content data in a compressed format from said external apparatus;
storing, in said storage apparatus, the content data acquired in the acquiring from said external apparatus, based on said identification information, independently of said page information;
storing in said storage apparatus a file of another vendor;
outputting the content data from said storage apparatus along with said page information on an output interface; and
removing all files from said storage apparatus except for files of the vendor.

4. An information processing apparatus, comprising:
a network device that transmits a call sign of a radio station, receives a Uniform Resource Locator (URL) in response to a transmission of the call sign of the radio station, transmits a request to the URL for page information, receives said page information, which includes identification information corresponding to content data, from an external apparatus in response to the request to the URL, and receives said content data, the identification information identifying a vendor;
a memory configured to store said content data received by said network device, based on said identification information, independently of said page information, and to store a file of another vendor;
an interface that outputs said content data along with said page information; and
a controller configured to register in said memory, in response to the identification information, said content data in an uncompressed format upon a reception of said content data in a compressed format from said external apparatus, to detect whether said memory is storing said content data independently of said page information, to control said interface to output said content data from said memory without an inquiry to the external apparatus when said controller detects that said memory is storing said content data independently of said page information, to control said network device to receive said content data from the external apparatus when said content data is not stored in said memory, and to remove all files from the memory except for files of the vendor.

5. The information processing apparatus according to claim 4, wherein said controller is configured to store in said memory the content data.

6. The information processing apparatus according to claim 5, wherein the content data is image data, and the page information defines a portal site.

7. The information processing apparatus according to claim 5, wherein the content data is sound data, and the page information defines a portal site.

8. The information processing apparatus according to claim 4, wherein said controller is configured to count a number of times the content data has been reproduced, and said controller is configured to store in said memory the content data, which has been accessed more than a certain number of times.

9. The information processing apparatus according to claim 4, wherein said controller is configured to count a number of times the content data has been reproduced, and said controller is configured to remove from said memory the content data, based on the number of times.

10. The information processing apparatus according to claim 9, wherein said controller is configured to register in said memory an indicator showing an importance of said content data, and to prevent said content data from being removed from said memory based on said indicator of said content data regardless of a number of times of access of said content data.

11. The information processing apparatus according to claim 4, wherein said controller reproduces the content data, and said controller is further configured to convert the content data into a compression format corresponding to characteristics of said controller, and to then register said content data in said memory.

12. The information reproduction apparatus according to claim 4, wherein the page information includes a Uniform Resource Locator (URL), and said controller is configured to access, when the content data is not stored in said memory, said URL included in the page information to acquire said content data from said external apparatus.

13. The information processing apparatus according to claim 4, wherein the controller is configured to translate the content data from a first format and a first size into a second format and a second size based on a characteristic of the interface.

14. The information processing apparatus according to claim 13, wherein the interface includes a display of predetermined dimensions, and the second size is based on the predetermined dimensions of the display.

15. The information processing apparatus according to claim 4, wherein, when a number of files cached in the memory exceeds a predetermined threshold, the controller removes all files from the memory except for the files of the vendor.

* * * * *